United States Patent
Matsuura

(10) Patent No.: US 10,871,408 B2
(45) Date of Patent: Dec. 22, 2020

(54) NOISE REMOVAL METHOD OF MATERIAL TEST AND MATERIAL TESTING MACHINE

(71) Applicant: Shimadzu Corporation, Kyoto (JP)

(72) Inventor: Tohru Matsuura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 306 days.

(21) Appl. No.: 16/009,669

(22) Filed: Jun. 15, 2018

(65) Prior Publication Data

US 2019/0086279 A1    Mar. 21, 2019

(30) Foreign Application Priority Data

Sep. 21, 2017 (JP) ................................. 2017-180800

(51) Int. Cl.
| | | |
|---|---|---|
| *G01L 1/26* | (2006.01) | |
| *G01N 3/06* | (2006.01) | |
| *G01N 3/08* | (2006.01) | |

(52) U.S. Cl.
CPC ................ *G01L 1/26* (2013.01); *G01N 3/066* (2013.01); *G01N 3/08* (2013.01); *G01N 2203/0017* (2013.01); *G01N 2203/0067* (2013.01); *G01N 2203/021* (2013.01); *G01N 2203/0676* (2013.01)

(58) Field of Classification Search
CPC . G01L 1/26; G01N 3/066; G01N 3/08; G01N 2203/0676; G01N 2203/0067; G01N 2203/021; G01N 2203/0017; G01N 3/307; G01N 2203/0075; G01N 2203/0048; G06K 9/00516
See application file for complete search history.

(56) References Cited

U.S. PATENT DOCUMENTS

| | | | | |
|---|---|---|---|---|
| 6,023,976 A | * | 2/2000 | Borza | ..................... F41H 11/12 |
| | | | | 73/598 |
| 9,110,092 B1 | * | 8/2015 | Magonov | ............... G05D 23/19 |
| 9,684,087 B2 | * | 6/2017 | Yang | ..................... G01V 1/364 |

(Continued)

FOREIGN PATENT DOCUMENTS

| | | |
|---|---|---|
| CN | 1358156 A | 7/2002 |
| EP | 0677922 A2 | 10/1995 |

(Continued)

OTHER PUBLICATIONS

Examination report dated Jun. 10, 2020, in corresponding European patent application No. 18192116.4, 10 pages.

(Continued)

*Primary Examiner* — Mohammad K Islam
(74) *Attorney, Agent, or Firm* — Maier & Maier, PLLC

(57) ABSTRACT

A breakage point is detected as a change point from raw data and the data is divided before and after the breakage point to obtain divided data D1 and D2. When the low-pass filtering is performed on each of the divided data D1 and D2 (step S13) and the filtering for all divided data ends, time-series data whose natural frequency is removed is reconstructed before and after the breakage point. When the reconstruction data are connected at the breakage point, it is possible to restore the time-series data of the test force to the time-series data whose natural vibration of the test machine body is removed while taking advantage of a change in test force at the breakage point.

7 Claims, 14 Drawing Sheets

(56) References Cited

U.S. PATENT DOCUMENTS

2014/0222373 A1* 8/2014 Sprenger ............... G01B 5/008
                                                       702/155
2016/0033346 A1* 2/2016 Kubicek ................. G01P 5/02
                                                       73/170.16
2018/0178313 A1* 6/2018 Nakayama ............ B23K 31/12

FOREIGN PATENT DOCUMENTS

| EP | 1197462 A1 | 4/2002 |
| JP | S59-182332 A | 10/1984 |
| JP | 2004-333221 A | 11/2004 |
| JP | 2014-178242 A | 9/2014 |
| JP | 2017-058273 A | 3/2017 |

OTHER PUBLICATIONS

The extended European search report dated Feb. 13, 2019, in corresponding European patent application No. 18192116.4; 8 pages.
S. Mahmoodi et al.; "Noise reduction, smoothing and time interval segmentation of noisy signals using an energy optimisation method"; IEE Proc.-Vis Image Signal Process; vol. 153; No. 2; Apr. 2006; pp. 101-108.
Chinese Office Action dated Sep. 24, 2020, in connection with corresponding CN Application No. 201811093923.0 (18 pp., including machine-generated English translation).

* cited by examiner

NOISE REMOVAL METHOD OF MATERIAL TEST AND MATERIAL TESTING MACHINE

FIELD

The present invention relates to a noise removal method of removing noise from data detected by a detector during a material test and a material testing machine.

BACKGROUND

In order to evaluate characteristics of materials, various material tests have been carried out in response to the types or properties of materials. A material testing machine which performs the material test includes a load mechanism which applies a test force to a test sample and a force detector which detects a force actually applied to the test sample (see Patent Literature 1).
[Patent Literature 1] JP-A-2004-333221

SUMMARY

FIG. 18 is a graph showing an example of data of a high-speed tensile test. The graph of FIG. 18 shows test force data obtained at a sampling frequency of 1000 kHz after a high-speed tensile test is performed with the condition of a test speed of 5 m/s. In the graph, a vertical axis indicates the test force (kN: Kilo Newton) and a horizontal axis indicates a time (μs: Micro Second).

According to the content of the material test, a suddenly changing data point may exist in the data detected by the force detector. As the data with the suddenly changing data point, a test result of a material test in which a test force is applied until a test piece is broken is exemplified. For example, when the test is performed by a tensile testing machine shown in Patent Literature 1, the test force suddenly falls due to the breakage of the test piece as in the graph of FIG. 18.

After the test piece is broken, the test force is not applied to the broken portion of the test piece, but an inertial force caused by the natural vibration of the testing machine (including the jig or the test piece) is detected by the force detector. Further, it is considered that a vibration of the test force data before the breakage is caused by the noise (caused by the inertial force according to the natural vibration) instead of the force actually applied to the test piece. Further, in the high-speed tensile test or high-speed impact test, high-frequency noise is easily mixed with the raw data detected by the force detector due to the fact that high-speed data is obtained. Thus, it is desirable to remove the noise from the test force data detected by the force detector in the high-speed tensile test.

FIG. 19 is a graph showing a low-pass filtering result according to conventional Fourier transform. FIG. 20 is a graph showing a low-pass filtering result according to a conventional movement average. In these graphs, a vertical axis indicates a test force (kN: Kilo Newton) and a horizontal axis indicates a time (μs: Micro Second). Further, in the graph, a waveform of the original data (raw data) detected by the force detector is indicated by a dashed line and a waveform whose a high-frequency component is removed by low-pass filtering is indicated by the solid line.

FIG. 19 shows a result in which the waveform of the test force data is subjected to Fourier transform to cut the high-frequency component of 10 kHz or more and is subjected to inverse Fourier transform. As for the vibration after the breakage, the noise is removed with a decrease in amplitude, but as indicated by the black arrow in the graph, excessive waves are synthesized to the data before the breakage. Further, as indicated by the outline arrow in the graph, the data at the breakage point where the data suddenly changes also has a problem in which a change in waveform of the data subjected to the filtering indicated by the solid line becomes smaller than a change in waveform of the original data indicated by the dashed line. For this reason, it is difficult to read an accurate time in which the test piece is actually broken from the data subjected to the filtering.

When the low-pass filtering is performed according to the movement average as in FIG. 20, a change in waveform of the data subjected to the filtering indicated by the solid line becomes smaller than a change in waveform of the raw data indicated by the dashed line in the vicinity of the start point where the test force suddenly starts to increase and the breakage point where the test force suddenly starts to decrease as indicated by the outline arrow in the graph. For this reason, in the data subjected to the filtering, it is difficult to read an accurate time in which the test force actually starts to be applied to the test piece and the corresponding displacement amount or an accurate time in which the test piece is actually broken and the displacement amount.

At the time of obtaining an elastic modulus, a test force-displacement graph is created and an inclination of the test force-displacement curve in an elastic range is calculated after a test starts. In such a test, as shown in FIG. 18, an input from the force detector is monitored from a timing before the load mechanism is driven to apply the test force to the test piece. Then, when the position of the start point where the test force starts to be applied to the test piece is different in the raw data and the data subjected to the filtering as in FIG. 20, the waveform in the test force-displacement diagram becomes dull. As a result, it is difficult to obtain a correct elastic modulus which is an inclination of test force-displacement curve in the elastic range.

Further, in the low-pass filtering according to the movement average, a problem arises in that the data of about the number of points of the movement average are omitted. Thus, when the number of points of the movement average is decreased to reduce data loss, a filtering effect is weakened and thus the high-frequency noise cannot be removed in some cases.

The invention has been made to solve the above-described problems and an object of the invention is to provide a noise removal method capable of removing high-frequency noise from raw data of a test force during a material test while taking advantage of characteristics of change points on the raw data detected by a force detector and a material testing machine.

According to the invention of claim 1, there is provided a noise removal method of removing high-frequency noise from raw data corresponding to time-series data of a test force detected by a force detector during a material test of applying a test force to a test object, including: a data dividing step of detecting a change point where a test force value suddenly changes from the raw data and dividing the raw data before and after the change point; a low-pass filtering step of removing high-frequency noise from each data divided in the data dividing step by a low-pass filter; and a data combining step of combining the divided data subjected to the removal of the high-frequency noise in the low-pass filtering step according to the original time series.

According to the invention of claim 2, there is provided the noise removal method of the material test of claim 1, wherein the low-pass filter is a wavelet filter, and wherein in the low-pass filtering step, the high-frequency noise is removed by discrete wavelet transform and discrete wavelet inverse transform.

According to the invention of claim 3, there is provided the noise removal method of the material test of claim 1, wherein the change point is a point where the test force value suddenly starts to increase after the test starts and/or a point where the test force value suddenly starts to decrease due to the breakage of the test object.

According to the invention of claim 4, there is provided the noise removal method of the material test of claim 3, wherein a cutoff frequency of the low-pass filter is determined by using a natural frequency of a test machine body obtained by performing Fourier transform on data at a time after the change point.

According to the invention of claim 5, there is provided the noise removal method of the material test of claim 3, wherein in the data dividing step, the raw data is divided by excluding data of a predetermined section from the change point, and wherein in the data combining step, the divided data subjected to the low-pass filtering are connected by interpolating blank data points corresponding to the predetermined section.

According to the invention of claim 6, there is provided the noise removal method of the material test of claim 1, wherein in the data combining step, a value of the change point is compared with a value of a data point at the same time as the change point after the low-pass filtering step of the divided data from the change point including the data at the change point and when the value of the change point is different from the value of the data point after the low-pass filtering step by a predetermined value or more, the value of the data point after the low-pass filtering step is replaced with the value of the change point of the raw data and the divided data after the low-pass filtering step are connected.

According to the invention of claim 7, there is provided a material testing machine for applying a test force to a test object by driving a load mechanism, including: a force detector which detects a test force applied to the test object; and a control device which controls the load mechanism, wherein the control device includes a data divider which detects a change point where a test force value suddenly changes from raw data corresponding to time-series data of a test force detected by the force detector and divides the raw data before and after the change point, a low-pass filter which removes high-frequency noise from each data divided by the data divider, and a data combiner which combines the divided data subjected to the removal of the high-frequency noise by the low-pass filter according to an original time series.

Advantageous Effects of the Invention

According to the invention of claims 1 to 7, for the raw data with the change point corresponding to the data point where the test force value detected by the force detector suddenly changes, the data before and after the change point is divided, the low-pass filtering is performed on each divided data, and the data are combined again. Accordingly, it is possible to obtain data whose the high-frequency noise is removed while taking advantage of the characteristic of the change point. Accordingly, the user can know a change state of the test force value more similar to the raw data and thus more accurately check the behavior of the test force applied to the test object.

According to the invention of claim 2, since the low-pass filter according to the wavelet transform and the wavelet inverse transform is used, it is possible to remove the high-frequency noise without the lack of the time information.

According to the invention of claim 3, since the change point is a point where the test force value suddenly starts to increase after the test starts, it is possible to more accurately check a relationship between the test force immediately after the test force is applied to the test object and the displacement generated in the test object and thus to obtain a correct elastic modulus. Further, since the change point is a point where the test force value suddenly starts to decrease due to the breakage of the test object, it is possible to more accurately check the behavior of the test force in the event of the breakage.

According to the invention of claim 4, since the cutoff frequency of the low-pass filter is determined by using the natural frequency of the test machine body obtained by performing Fourier transform on the data at a time after the change point, it is possible to calculate an optimal filter constant for preventing a problem in which the inertial force caused by the natural vibration overlaps the detection value of the force detector.

According to the invention of claim 5, since the raw data is divided by excluding the data of a predetermined section from the change point and the blank data points corresponding to the predetermined section are interpolated so that the divided data after the low-pass filtering are connected, it is possible to prevent a problem in which a connection portion of the divided data becomes unnatural compared to a change in test force detected by the actual force detector.

According to the invention of claim 6, when the test force value of the data point at the same time as the change point after the low-pass filtering of the former divided data from the change point including the data at the change point is different from the test force value of the change point of the raw data, the data point after the low-pass filtering is replaced with the change point of the raw data and the divided data after the low-pass filtering are connected. Accordingly, since it is possible to reduce an unnatural connection portion between the divided data, it is possible to suggest the data subjected to the low-pass filtering to the user while taking advantage of the characteristics of the change point.

DETAILED DESCRIPTION OF THE DRAWINGS

Figure 1:
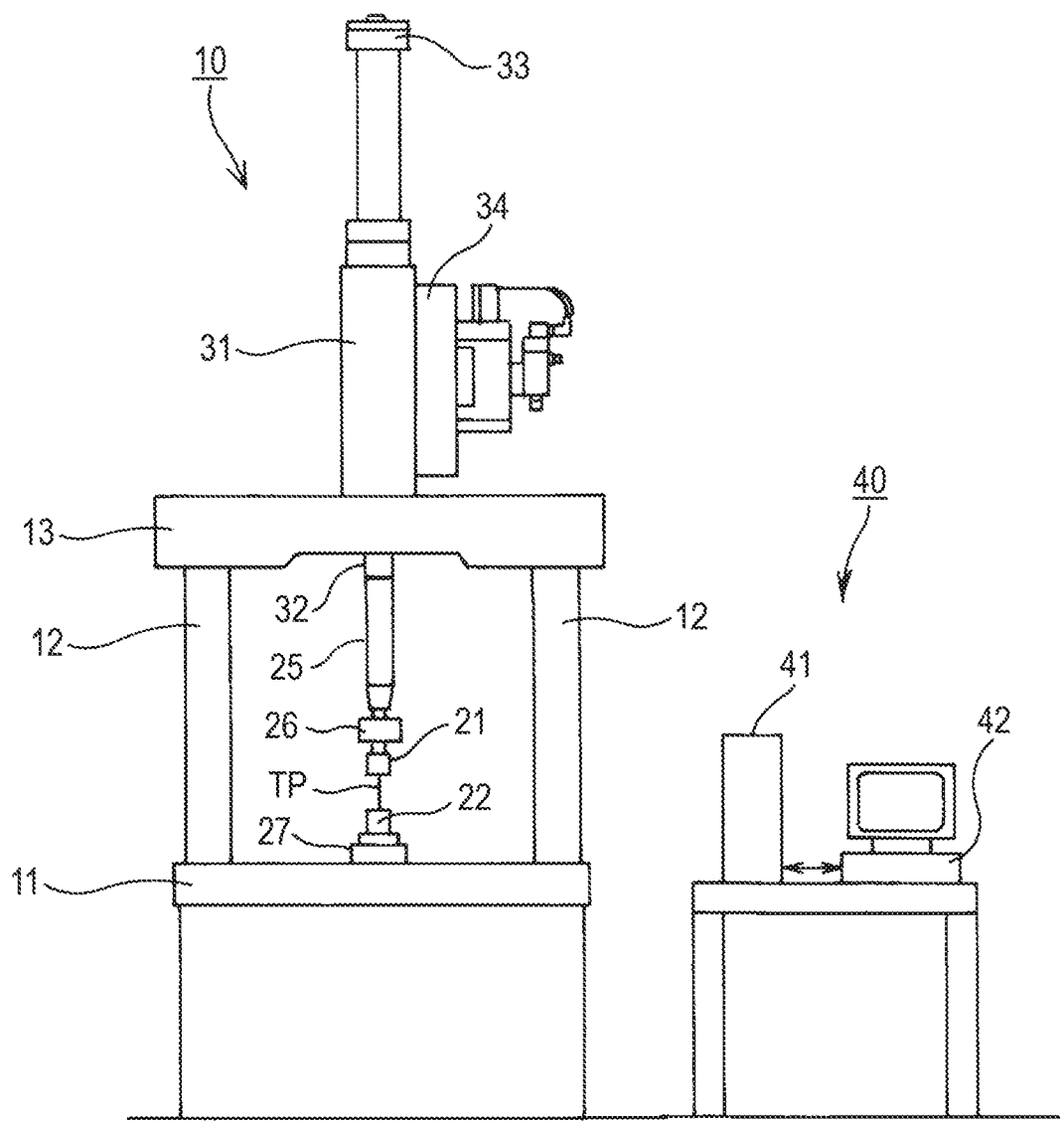
FIG. 1 is an outline diagram of a material testing machine according to the invention.
Figure 2:
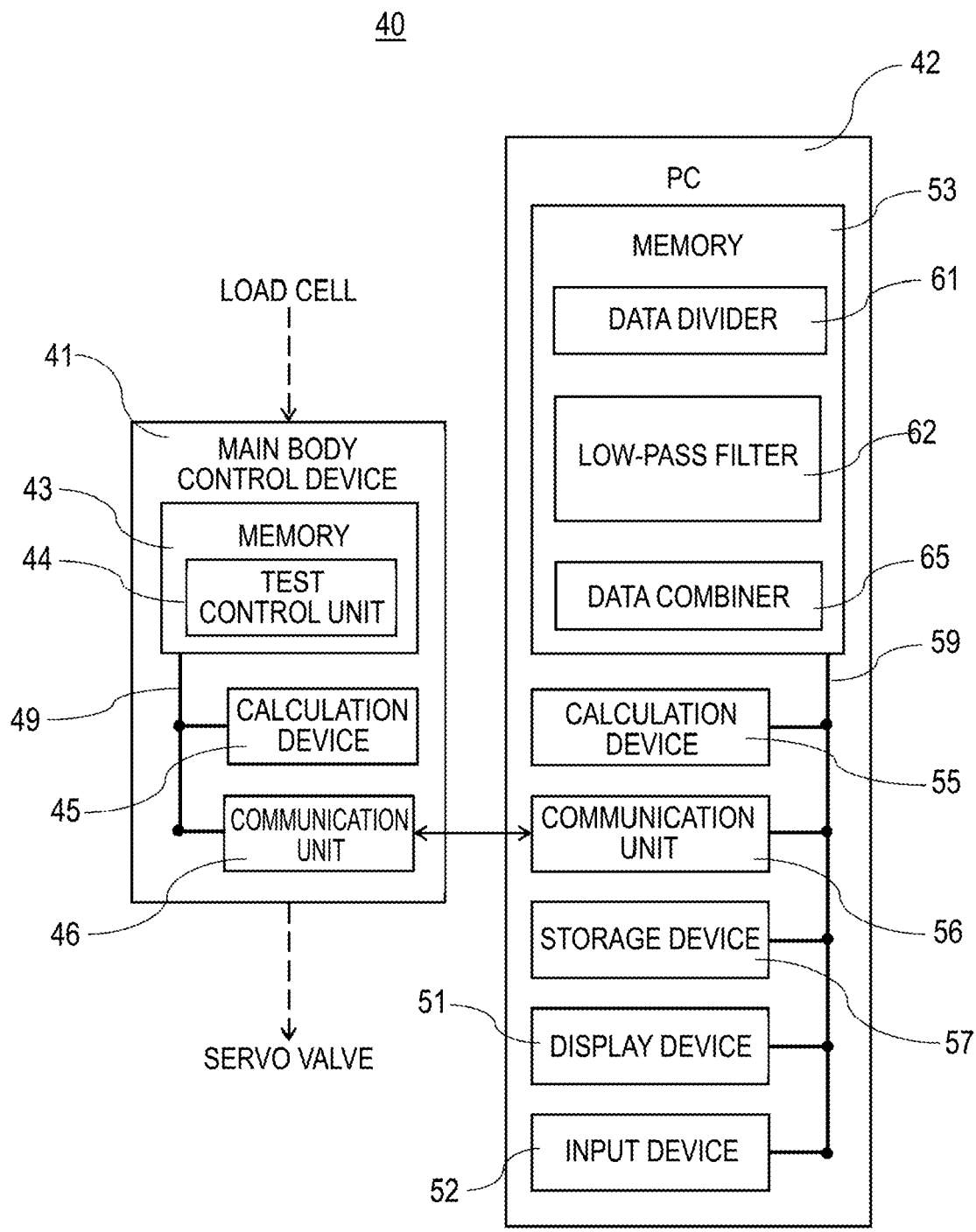
FIG. 2 is a block diagram showing a main control system of the material testing machine according to the invention.

Hereinafter, an embodiment of the invention will be described with reference to the drawings. FIG. 1 is an outline diagram of a material testing machine according to the invention. FIG. 2 is a block diagram showing a main control system of the material testing machine according to the invention.

The material testing machine is used to perform an impact test which suddenly applies an impact load to a test piece TP by driving a load mechanism using the test piece TP as a test object and is also referred to as a high-speed tensile testing machine. The material testing machine includes a test machine body 10 and a control device 40. The test machine body 10 includes a table 11, a pair of support columns 12 uprightly formed on the table 11, a cross yoke 13 hanging over the pair of support columns 12, and a hydraulic cylinder 31 fixed to the cross yoke 13.

The hydraulic cylinder 31 is operated by hydraulic oil supplied from a hydraulic source (not shown) disposed inside the table through a servo valve 34. An upper gripper 21 is connected to a piston rod 32 of the hydraulic cylinder 31 through a running jig 25 and a joint 26. Meanwhile, a lower gripper 22 is connected to the table 11 through a load cell 27 which is a force detector. In such a configuration of the test machine body 10, a running section is provided in the tensile direction of the running jig 25 and the piston rod 32 is raised at a high speed of 0.1 to 20 m/s to perform a high-speed tensile test such that a pair of grippers gripping both end portions of the test piece TP is suddenly separated from each other. The displacement (stroke) of the load mechanism, that is, the movement amount of the piston rod 32 during the high-speed tensile test is detected by a stroke sensor 33 and the test force at that time is detected by the load cell 27. Additionally, the growth (displacement) of the test piece TP may be obtained from the detection value of the stroke sensor 33 or may be measured by another displacement meter (not shown).

The control device 40 includes a main body control device 41 for controlling the operation of the test machine body 10 and a personal computer 42. The main body control device 41 includes a memory 43 which stores a program, a calculation device 45 which is a micro processing unit (MPU) or the like for performing various kinds of calculation, and a communication unit 46 which communicates with the personal computer 42. The memory 43, the calculation device 45, and the communication unit 46 are connected to one another by a bus 49. Further, the main body control device 41 includes a test control unit 44 as a functional configuration. The test control unit 44 is stored in the memory 43 as a test control program. When the test control program is executed at the time of performing the high-speed tensile test, a control signal is supplied to the servo valve 34 so that the hydraulic cylinder 31 is operated. An output signal of the stroke sensor 33 and an output signal of the load cell 27 are received by the main body control device 41 at a predetermined time interval.

The personal computer 42 includes a memory 53 which includes a ROM storing a data analysis program, a RAM loading the program at the time of executing the program and temporarily storing data, and the like, a calculation device 55 which is a central processing unit (CPU) or the like for performing various kinds of calculation, a communication unit 56 which communicates with an external connection device such as the main body control device 41, a storage device 57 which stores data, a display device 51 on which a test result is displayed, and an input device 52 which inputs a test condition. The memory 53 stores a program for realizing a function by operating the calculation device 55. In addition, the storage device is a storage unit which stores time-series data corresponding to the raw data of the test force input from the load cell 27 and is configured as a large-capacity storage device such as a hard disk drive (HDD). The memory 53, the calculation device 55, the communication unit 56, the storage device 57, the display device 51, and the input device 52 are connected to one another by a bus 59.

In FIG. 2, a program installed in the personal computer 42 is indicated as a functional block. In this embodiment, as the functional block, a data divider 61 for dividing data before and after a changing point where data suddenly changes in the noise removal from data to be described later, a low-pass filter 62 for performing low-pass filtering on each divided data, and a data combiner 65 for combining data divided after the low-pass filtering are provided.

Figure 3:
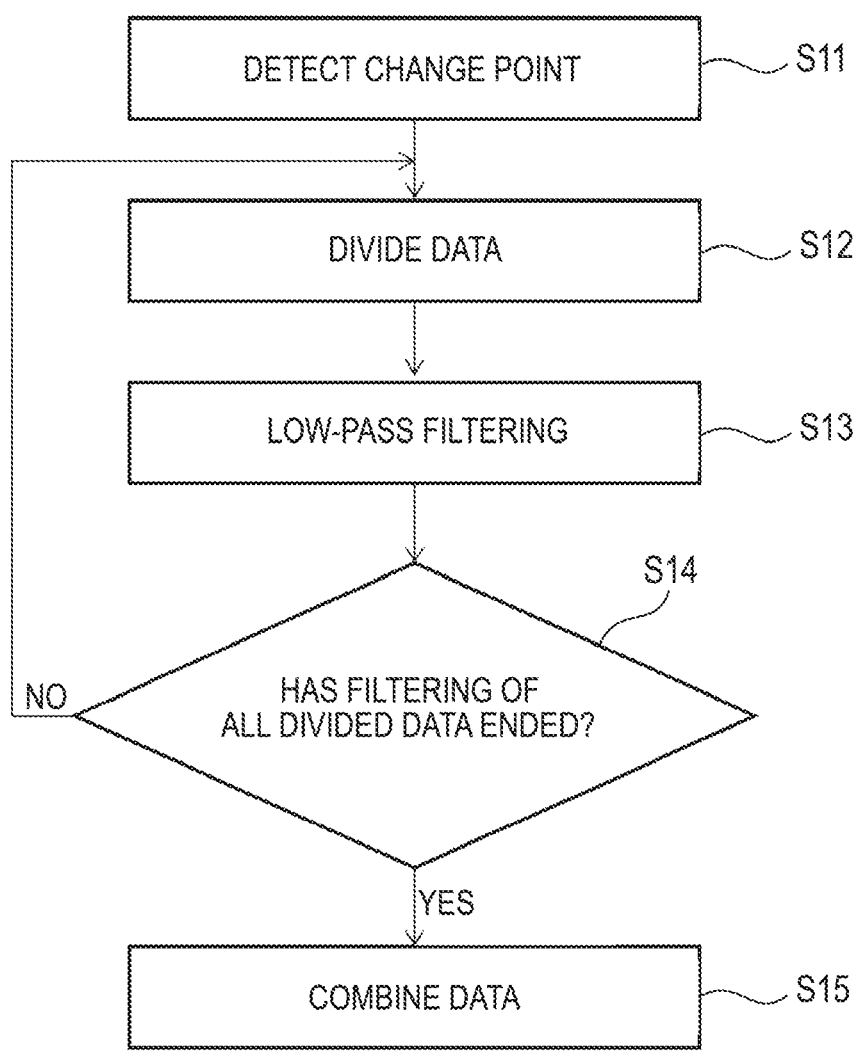
FIG. 3 is a flowchart showing a procedure of removing noise from raw data of a test force.
Figure 4:
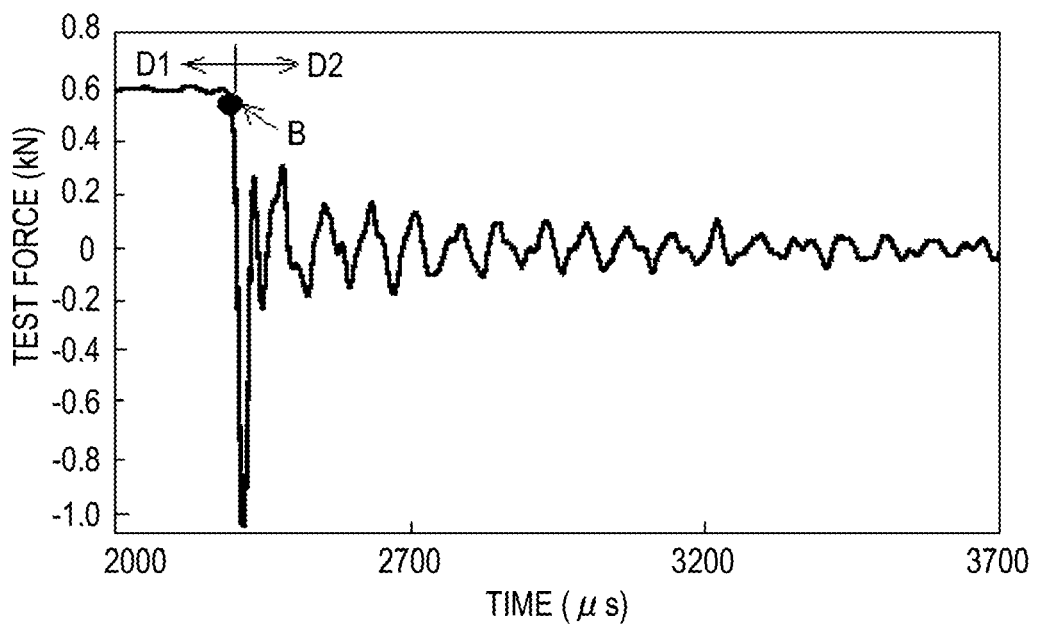
FIG. 4 is a graph showing data in the vicinity of a breakage point of data of a high-speed tensile test of FIG. 18.
Figure 5:
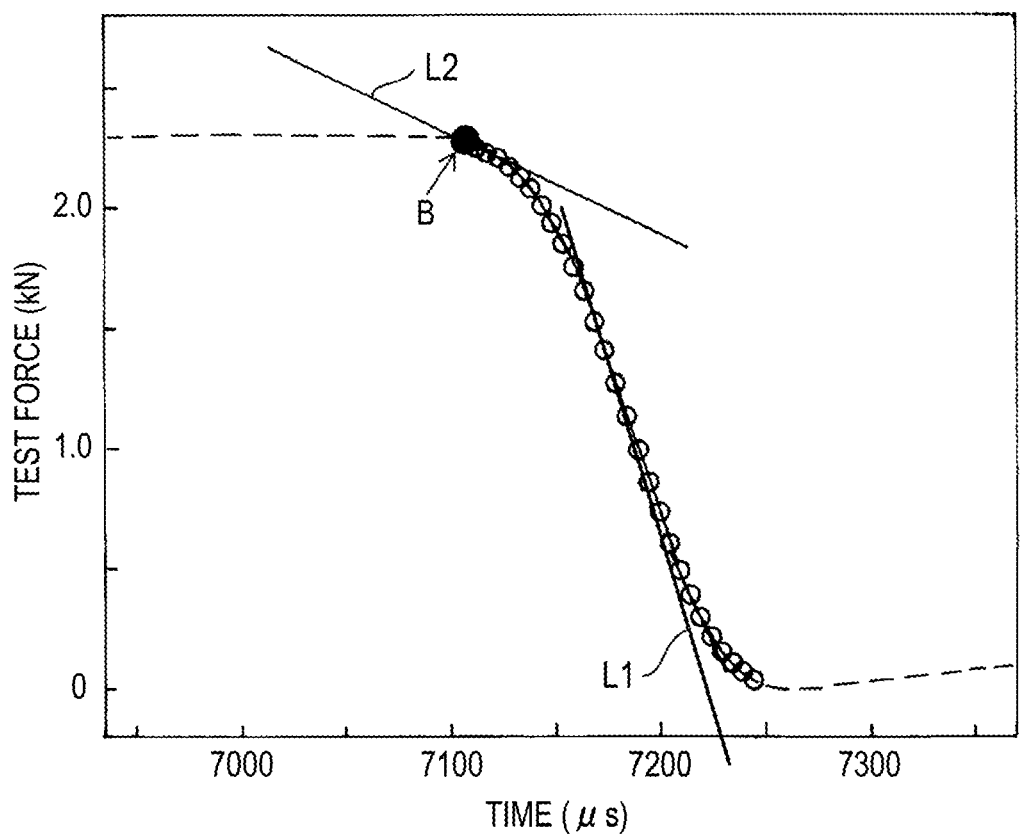
FIG. 5 is a graph illustrating the detection of the breakage point.

A noise removal method which is performed in the material testing machine with the above-described configuration will be described. FIG. 3 is a flowchart showing a procedure of removing noise from the raw data of the test force. FIG. 4 is a graph showing data in the vicinity of the breakage point in the data of the high-speed tensile test of FIG. 18. FIG. 5 is a graph illustrating the detection of the breakage point. In the graphs of FIGS. 4 and 5, a vertical axis indicates the test force (kN: Kilo Newton) and a horizontal axis indicates the time (µs: Micro Second). Further, FIG. 5 shows an example in which the breakage point of the test force data is detected at the time of performing the high-speed tensile test at the test speed of 20 m/s and the sampling point of the test force value is partially indicated by a white circle.

When the piston rod 32 is raised after the test starts, the load cell 27 detects the test force applied to the test piece TP. The test force suddenly decreases when the test piece TP is broken and then the inertial force due to the natural vibration of the test machine body 10 is detected. In this embodiment, in order to remove the high-frequency noise from the time-series data of the test force while taking advantage of the data of the change point where the test force suddenly changes such as the breakage point, the change point (that is, the breakage point B in FIGS. 4 and 5) is detected from the raw data (step S11) and the data before and after the breakage point B is divided (step S12: a data dividing step) to obtain the divided data D1 and D2. In the example shown in FIG. 4, the divided data D1 is data before the time of the breakage point B and the divided data D2 is data after the time of the breakage point B.

As for the breakage point B (indicated by a black circle in FIGS. 4 and 5), the test force suddenly decreases after the breakage as shown in FIG. 5. Accordingly, the breakage point is obtained by detecting a contact with the data waveform of the tangent line L2 having an inclination obtained by multiplying a predetermined reduction rate by the tangent line L1 when the tangent line of the curve has a maximum inclination. In this way, in this embodiment, the breakage point B is detected by using the reduction rate of the inclination with respect to the maximum inclination when the test force changes after the breakage. The reduction rate of the inclination can be set by the user according to the test speed or the like.

Figure 6:
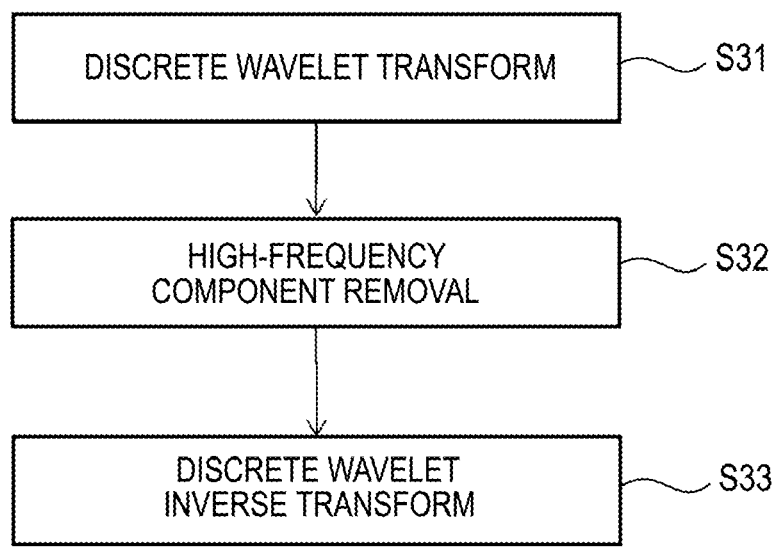
FIG. 6 is a flowchart showing a procedure of low-pass filtering.

The low-pass filtering will be described. FIG. 6 is a flowchart showing a procedure of the low-pass filtering. In FIG. 6, the filtering when the low-pass filter 62 is a wavelet filter will be described. The low-pass filtering step (step S13) includes a discrete wavelet transform step (step S31) of separating the divided data D1 and D2, a high-frequency component removal step (step S32), and a discrete wavelet inverse transform step (step S33) of reconstructing the divided data D1 and D2. The low-pass filtering is realized by executing a program which is read by the calculation device 55 from the low-pass filter 62 of the memory 53.

In this embodiment, vibration caused by the natural frequency of the test machine body 10 is removed from the time-series data of the test force measured by the load cell 27. In order to remove the natural vibration after the test piece is broken, there is a need to detect the natural frequency Nf (Hz) of the testing machine (including the jig and the test piece TP) and to sort the natural frequency Nf from the test force data by the filtering. Additionally, the natural frequency Nf of the testing machine can be sorted by analyzing the data (in this embodiment, the divided data D2) after the breakage according to fast Fourier transform.

Figure 7:
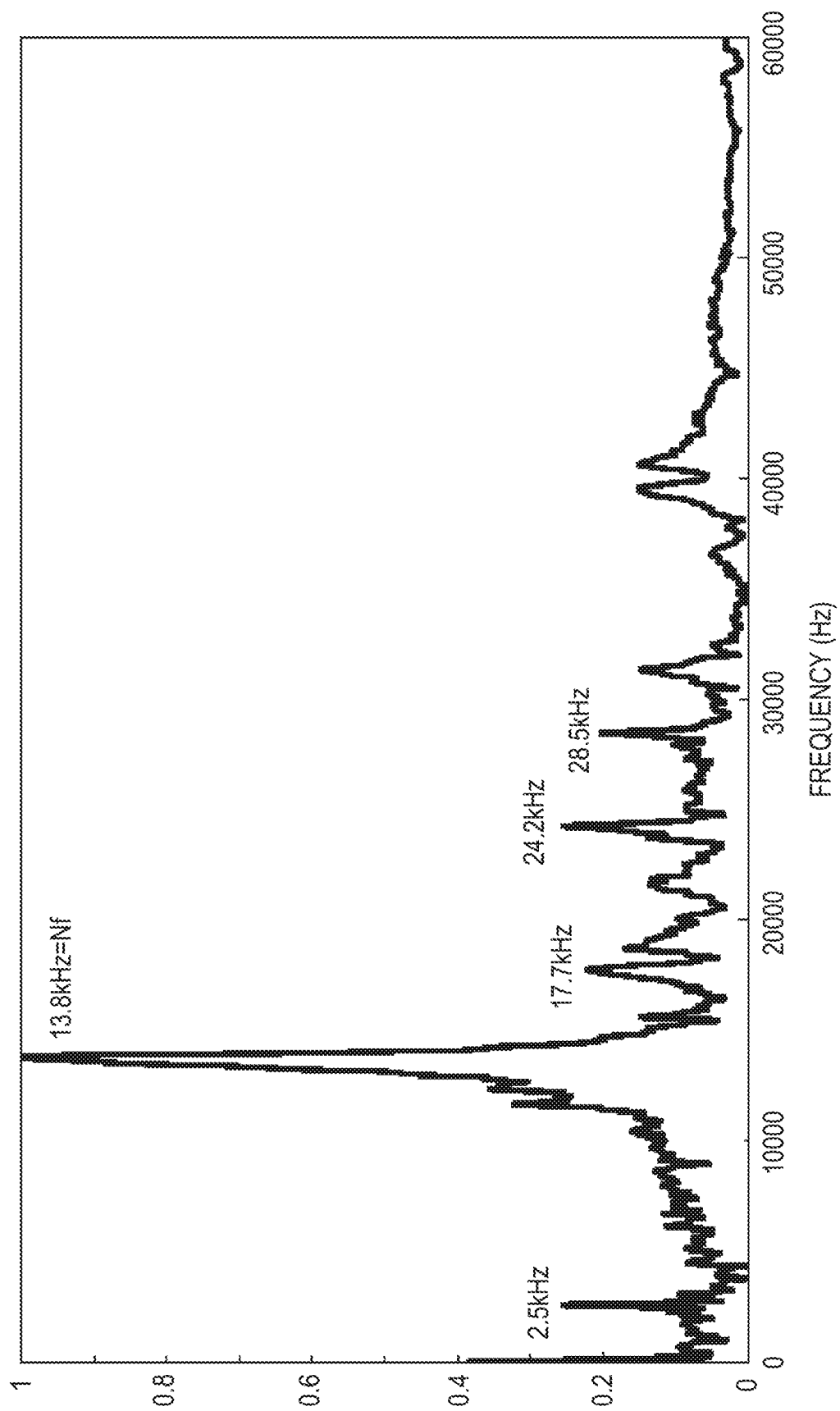
FIG. 7 is a power spectrum showing a result of fast Fourier transform analysis for data after the breakage point in the data of the high-speed tensile test of FIG. 18.
Figure 18:
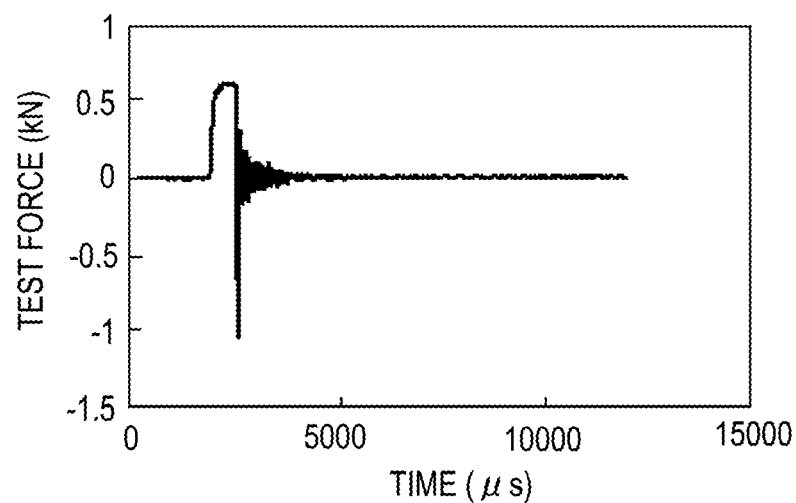
FIG. 18 is a graph showing an example of data of a high-speed tensile test.
Figure 19:
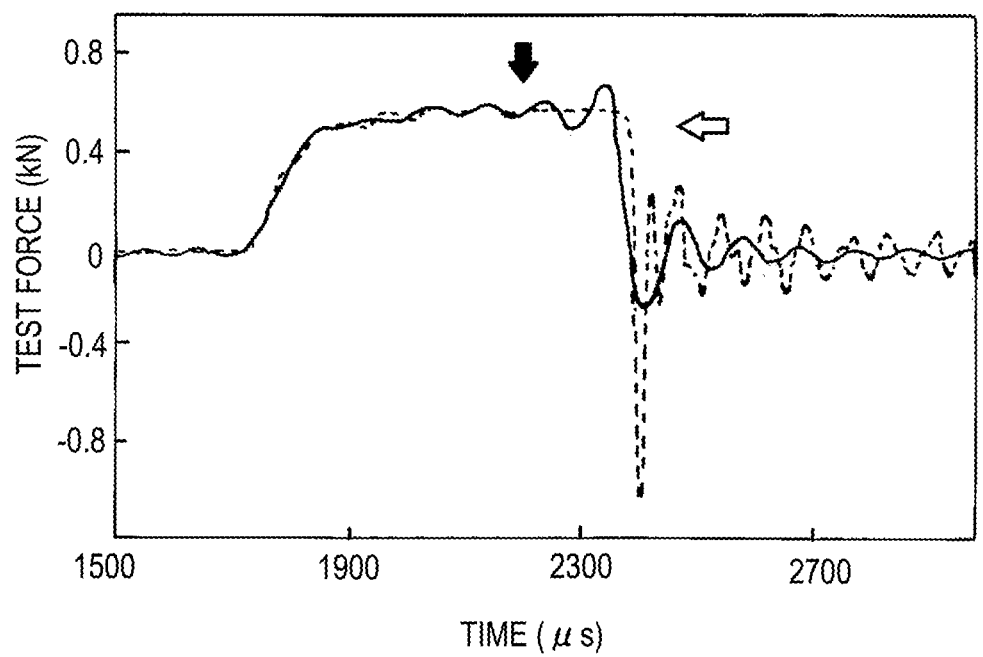
FIG. 19 is a graph showing a low-pass filtering result according to conventional Fourier transform.

FIG. 7 is a power spectrum showing a result of fast Fourier transform analysis of data after the breakage point in the data of the high-speed tensile test of FIG. 18. In FIG. 7, a horizontal axis indicates a frequency (Hz: Hertz) and a vertical axis indicates power for each frequency resolution. Additionally, the data of the high-speed tensile test of FIG. 18 is the test result showing a change in test force collected at the sampling frequency of 1000 kHz in the test at the tensile speed of 5 m/s. Further, the frequency resolution of the fast Fourier transform analysis of FIG. 7 can be obtained by dividing the sampling frequency by the number of sampling points.

In the test result of FIG. 18, as shown in FIG. 7, the divided data D2 after the breakage point is subjected to Fourier transform and 13.8 kHz which is the highest peak is detected as the natural frequency Nf of the test machine body 10. The natural frequency Nf is used to determine the cutoff frequency of the low-pass filter 62. In this embodiment, the optimal decomposition level of the discrete wavelet transform is calculated by determining the level of the filter bank which is the low-pass filter 62 for preventing the high frequency such as the natural frequency Nf through the signal of the frequency lower than the natural frequency Nf. That is, it is possible to calculate an optimal filter constant corresponding to the frequency of the noise by using a Fourier transform result.

Figure 8:
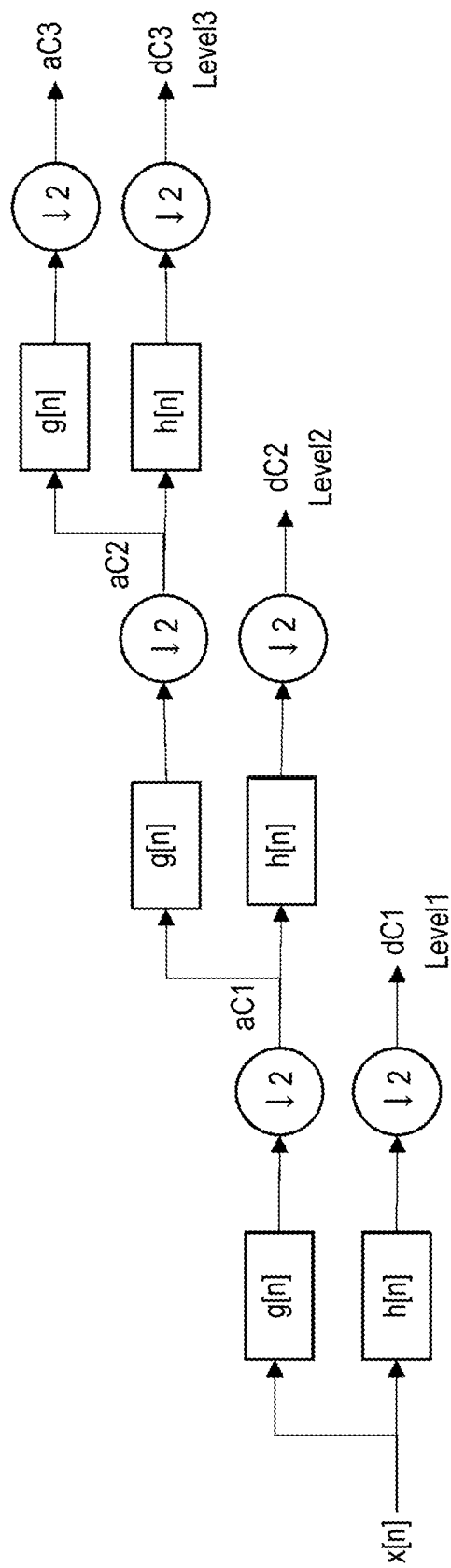
FIG. 8 is a conceptual diagram of discrete wavelet transform.

FIG. 8 is a conceptual diagram of discrete wavelet transform. In this drawing, for convenience of description, an example of a three-stage filter bank is shown.

The discrete wavelet transform of the signal x is calculated through a pair of filters. That is, the signal x is passed through a low-pass filter (g[n]) having an impulse response of g and a high-pass filter (h[n]) having an impulse response of h and then is down-sampled in half by a down sampler to decompose the signal into a plurality of frequency components. Here, a result obtained from the high-pass filter is referred to as a detail coefficient (dC) and a result obtained from the low-pass filter is referred to as an approximation coefficient (aC). Then, the decomposition of the approximation coefficient is repeated a plurality of times to obtain a low frequency and a high frequency in each level. The calculation is repeated until a pair of the detail coefficient and the approximation coefficient is obtained. In FIG. 8, for convenience of description, an example of a three-level filter bank is shown. In each of Levels 1 to 3, the decomposition of the approximation coefficients aC1 and aC2 is repeated to obtain the detail coefficients dC1 to dC3 and the approximation coefficient aC3. For example, in a six-level filter bank, the waveform of the time-series data is decomposed into six levels of the high-frequency component and the low-frequency component.

The discrete wavelet inverse transform is to restore the time-series data equal to the original signal x by a signal process opposite to that of the decomposition by using the detail coefficient dC and the approximation coefficient aC obtained from the discrete wavelet transform. Additionally, the removal of the high-frequency noise from the time-series data of the test force (step S32) is realized by setting the high-pass filter component of each level to 0 (zero). Then, the discrete wavelet inverse transform is performed to reconstruct the time-series data whose the high-frequency noise component is removed.

Additionally, in the low-pass filtering of the embodiment, the cutoff frequency is determined from the natural frequency Nf of 13.8 kHz of the test machine body 10 obtained by performing Fourier transform on the divided data D2 after the breakage point and the discrete wavelet transform and the discrete wavelet inverse transform having six decomposition levels are performed.

Figure 9:
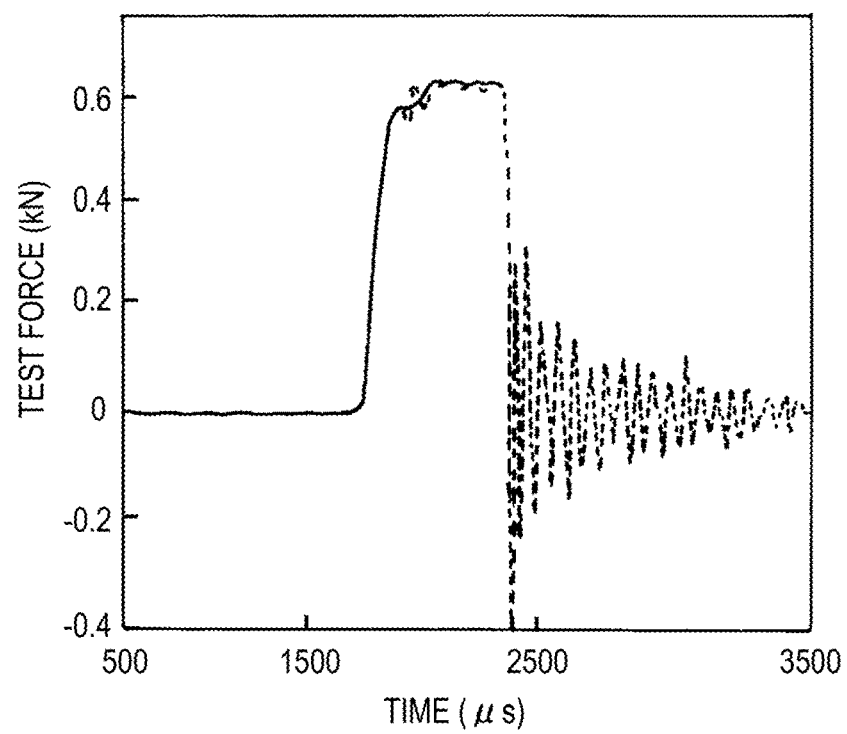
FIG. 9 is a graph showing data after low-pass filtering.
Figure 10:
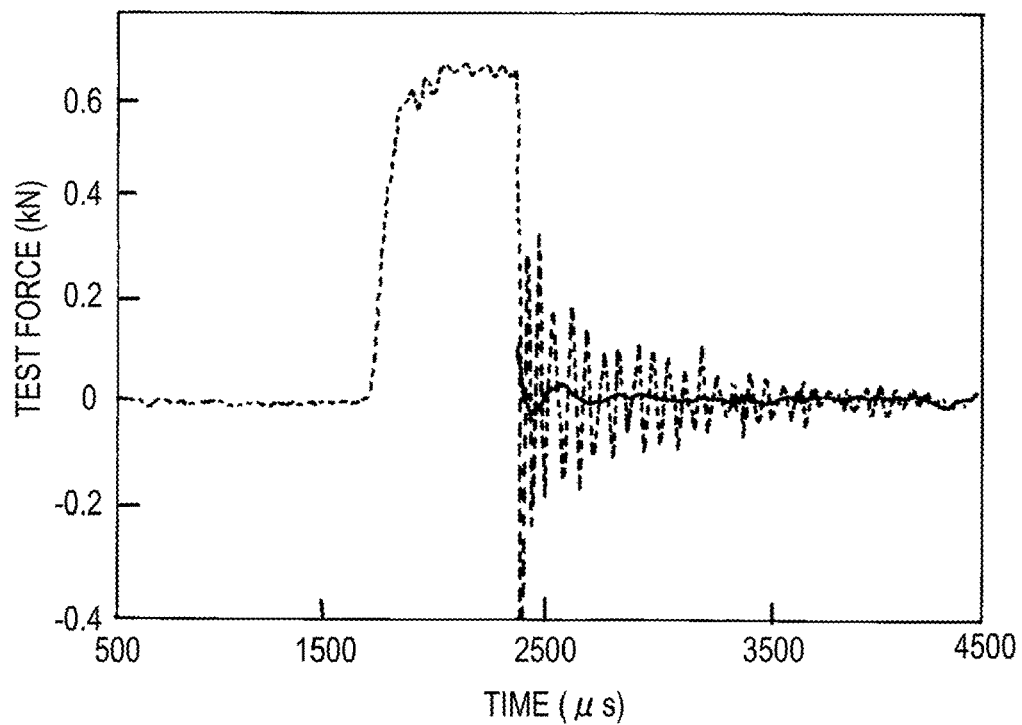
FIG. 10 is a graph showing data after low-pass filtering.
Figure 11:
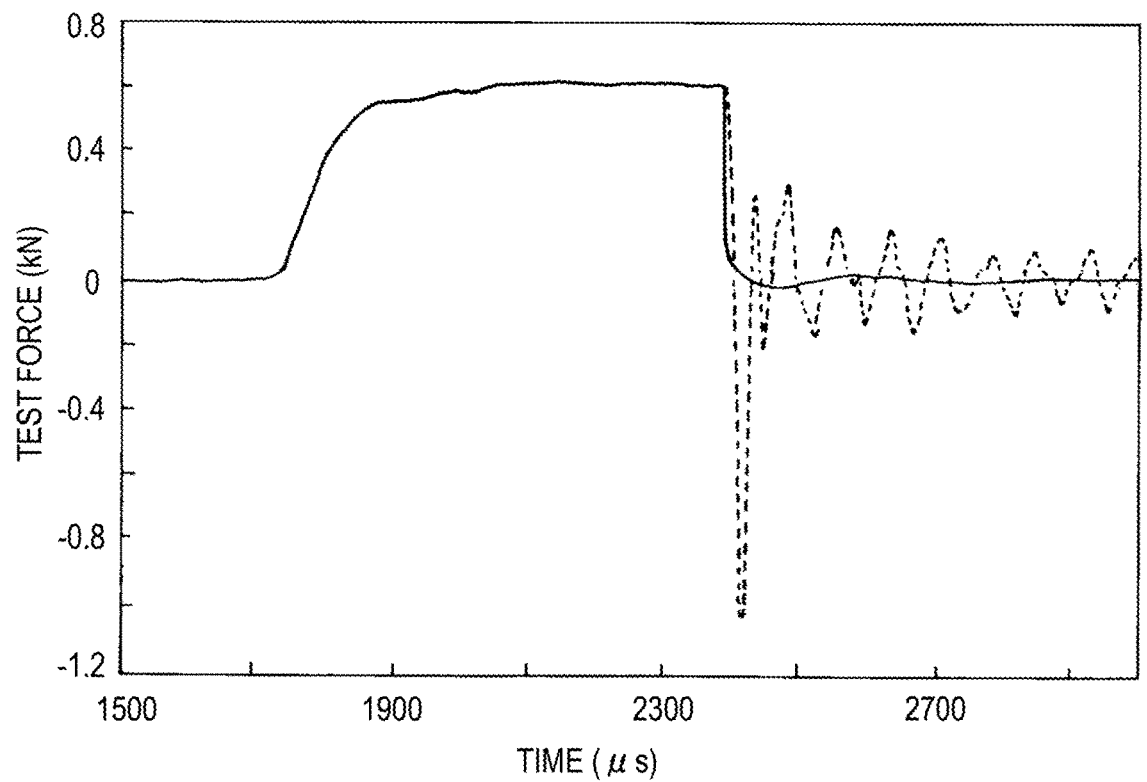
FIG. 11 is a graph showing data after data connection.
Figure 12:
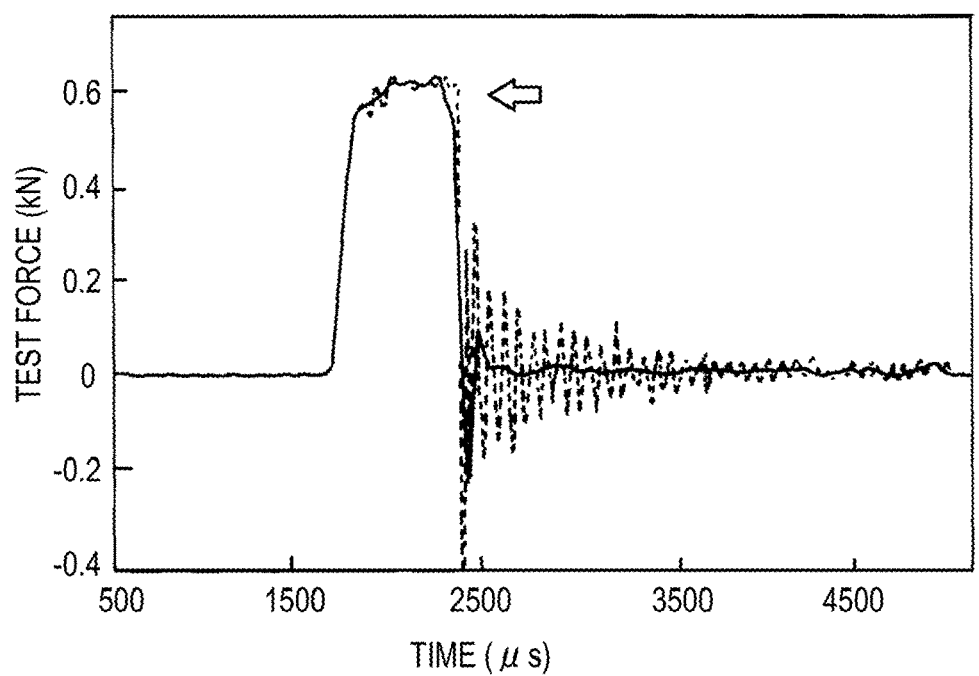
FIG. 12 is a graph showing a case in which low-pass filtering is performed without data division.

FIGS. 9 and 10 are graphs showing data after the low-pass filtering. FIG. 11 is a graph showing data after data is connected and FIG. 12 is a graph showing a case in which the low-pass filtering is performed without dividing data. In such a graph, a vertical axis indicates a test force (kN) and a horizontal axis indicates a time (μs). In the drawings, a dashed line indicates the raw data and the solid line indicates the data after the low-pass filtering. FIG. 9 shows the data obtained after the low-pass filtering is performed on the divided data D1 and FIG. 10 shows the data obtained after the low-pass filtering is performed on the divided data D2.

Again, referring to FIGS. 3 and 6, the discrete wavelet transform (step S31), the high-frequency component removal (step S32), and the discrete wavelet inverse transform (step S33) are performed on each of the divided data D1 and D2. Then, when the low-pass filtering for all divided data ends (step S14), the time-series data whose the natural frequency Nf is removed before and after the breakage point B is reconstructed as indicated by the solid lines of FIGS. 9 and 10. When the reconstruction data indicated by the solid lines in FIGS. 9 and 10 is connected at the breakage point B (step S15: a data combining step), it is possible to restore the time-series data whose the natural vibration of the test machine body 10 is removed while taking advantage of the test force data based on a change in test force at the breakage point (see FIG. 11). Additionally, the combination of data is realized by executing the program which is read from the data combiner 65 of the memory 53 by the calculation device 55.

As shown in FIG. 12, when the raw data obtained from the load cell 27 is subjected to the low-pass filtering according to the wavelet transform while not being divided before and after the breakage point B, a problem arises in that the waveform becomes dull in the vicinity of the breakage point indicated by the outline arrow in the data subjected to the low-pass filtering indicated by the solid line so that the characteristic change of the test force immediately after the actual breakage cannot be restored. On the contrary, as shown in FIG. 11, when the low-pass filtering is performed after the time-series data is divided before and after the breakage point, the breakage time information is held before and after the filtering. At the same time, the test force applied to the test piece TP immediately before the breakage is not lowered due to the filtering and the waveform having the change characteristic of the test force in the event of the breakage is restored. In this way, since the high-frequency noise such as the natural vibration is removed while taking advantage of the characteristic change of the test force due to the breakage of the test piece TP, the user can more accurately check the characteristic of the test force applied to the test piece TP.

Additionally, in the above-described embodiment, the low-pass filtering using the wavelet transform has been described. However, since the low-pass filtering is performed on each divided time-series data, the rounding of the waveform in the vicinity of the breakage point can be improved also by the low-pass filtering according to the movement average described with reference to FIG. 18.

Figure 13:
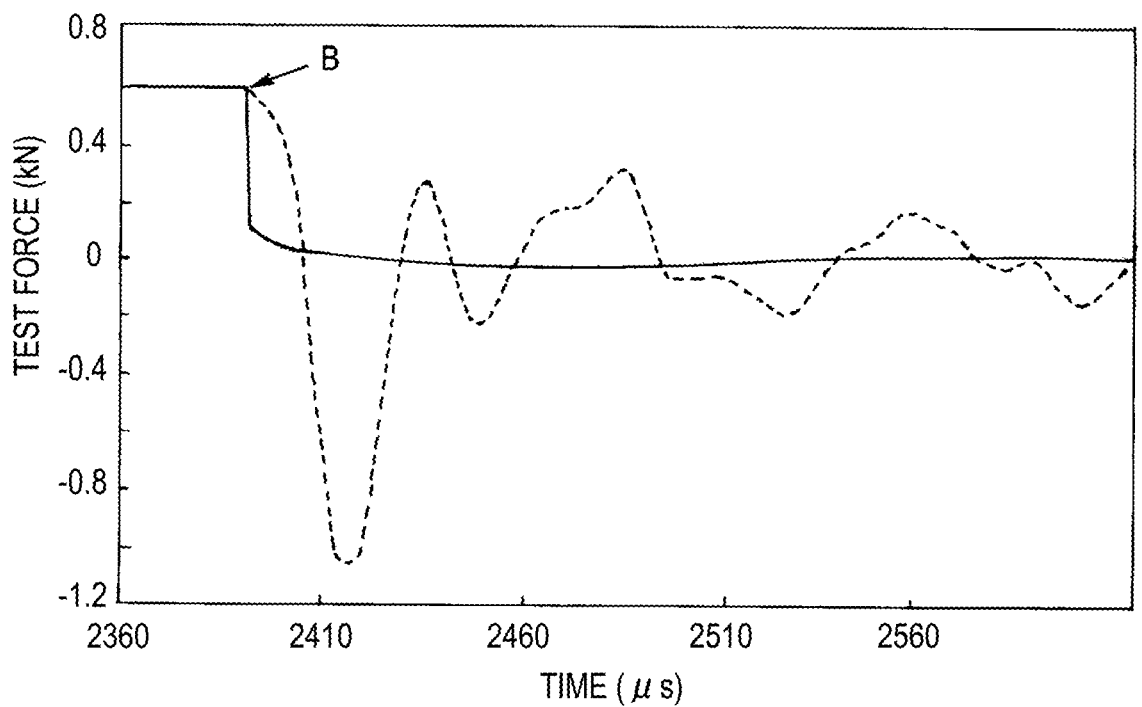
FIG. 13 is a graph illustrating a data connection method.
Figure 14:
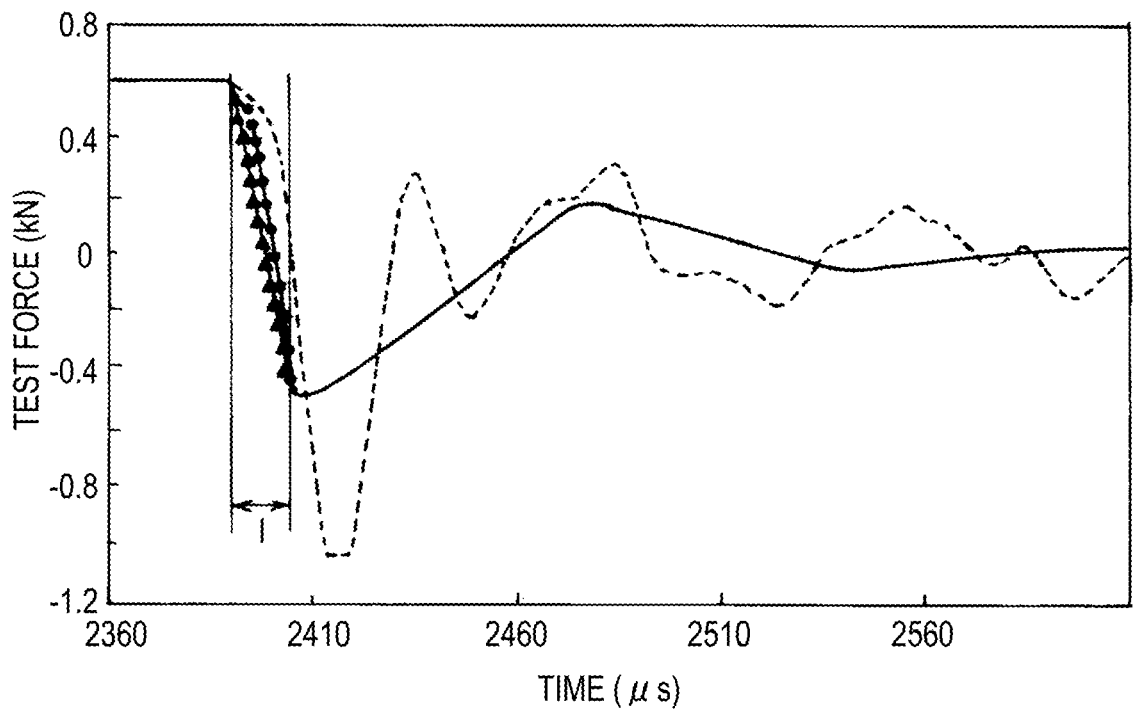
FIG. 14 is a graph illustrating a data connection method.
Figure 15:
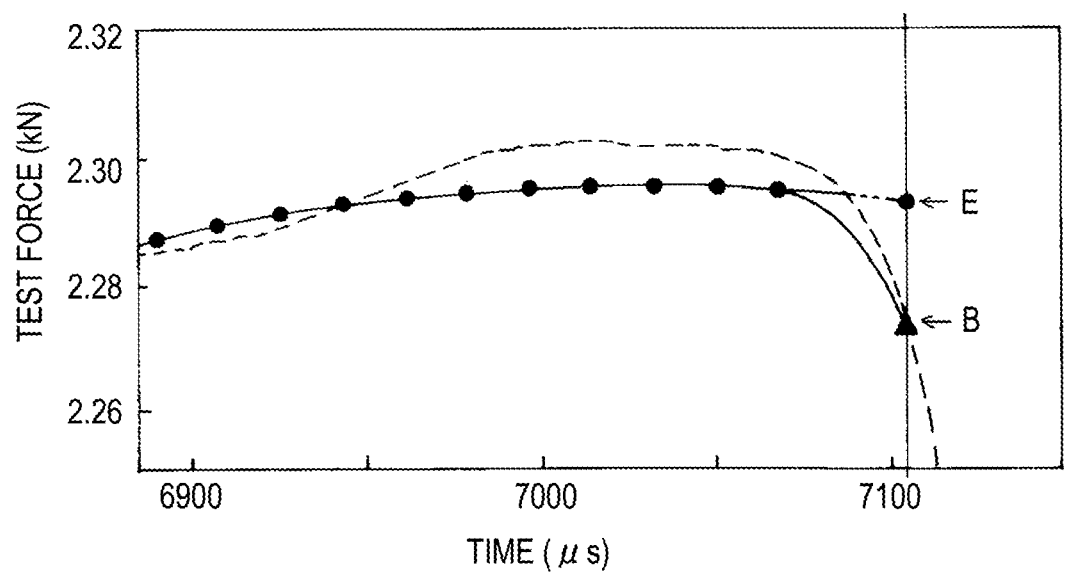
FIG. 15 is a graph illustrating a data connection method.

Next, a modified example of the connection between the divided data D1 and the divided data D2 will be described. FIGS. 13 to 15 are graphs illustrating a data connection method. In these graphs, a vertical axis indicates the test force (kN) and a horizontal axis indicates the time (μs). Further, in FIG. 14, a triangle indicates an example in which the low-pass filtering result is directly connected and a circle indicates an example in which appropriate data is physically connected by spline interpolation.

When the divided data D1 and the divided data D2 divided at the breakage point B are respectively subjected to the low-pass filtering according to the wavelet transform and are connected at the time of the breakage point B, the data is not continuous at the breakage point as shown in FIG. 13. In this modified example, such an unnatural data connection is corrected so as to approximate a change in test force value detected by the load cell 27 in the actual material test.

First, in a modified example shown in FIG. 14, a data point for a predetermined section where the test force suddenly decreases immediately after the breakage point B is excluded at the time of dividing the time-series data before and after the breakage point B (step S12). The predetermined section is a section I including the data point until the test force of the raw data decreasing from the breakage point B becomes 0 (zero).

A plurality of data points of the blank corresponding to the section I between the rearmost data point after the low-pass filtering of the divided data D1 and the foremost data point after the low-pass filtering of the divided data D2 are calculated by using a non-linear interpolation such as a linear interpolation (indicated by a black triangle in FIG. 14) or a spline interpolation (indicated by a black circle in FIG. 14). Accordingly, the data after the low-pass filtering of the divided data D1 and D2 are smoothly connected to each other so that the time-series data whose noise is removed such as the raw data is reconstructed. In this way, it is possible to remove the high-frequency noise from the time-series data of the test force while taking advantage of an important change portion such as the breakage point B of the test piece TP by using the material testing machine of the invention.

Next, in a modified example shown in FIG. 15, the test force value of the data point E corresponding to the time of the breakage point B after the low-pass filtering of the divided data D1 before the breakage including the data at the breakage point B is compared with the test force value of the breakage point B (indicated by a black triangle in FIG. 15) of the raw data. Then, when the test force value of the data point E after the low-pass filtering becomes larger than the test force value of the breakage point B of the raw data, the divided data is connected by the replacement with the value of the breakage point B of the raw data. This is to prevent a problem in which the test force value physically decreases due to the breakage of the test piece TP and the test force value becomes larger than the actual value due to the influence of the low-pass filter 62. In addition, the data before the data point E corresponding to the time of the breakage point B after the low-pass filtering of the divided data D1 is supplemented so that points are excluded to a degree not exceeding the maximum curvature of the entire test at the breakage point B of the raw data and the excluded points smoothly pass through the breakage point B.

By the modified example shown in FIG. 15, when the test force value of the data point at the same time as the breakage point B of the time-series data whose high-frequency noise component is removed by the low-pass filtering is replaced with the test force value of the breakage point B, the unnatural connection between the divided data is reduced and thus the data after the low-pass filtering can approximate a change in test force of the raw data in the event of the breakage. Thus, it is possible to suggest the data subjected to the low-pass filtering to the user while taking advantage of the characteristics of the change point.

Figure 16:
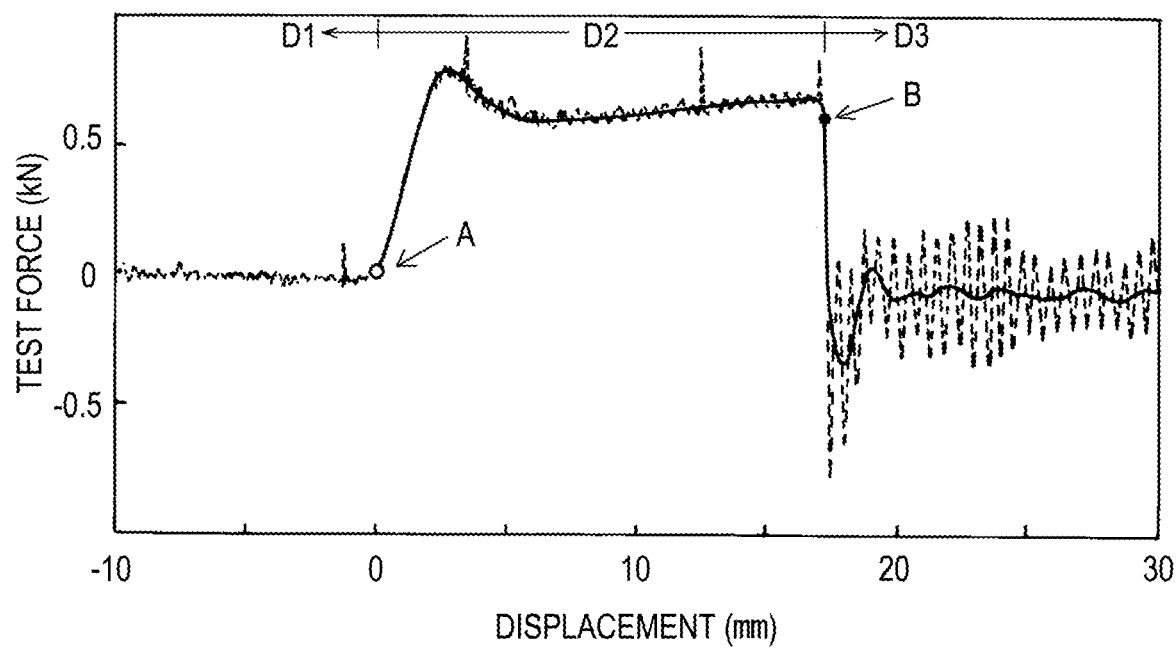
FIG. 16 is a test force-displacement diagram.
Figure 17A:
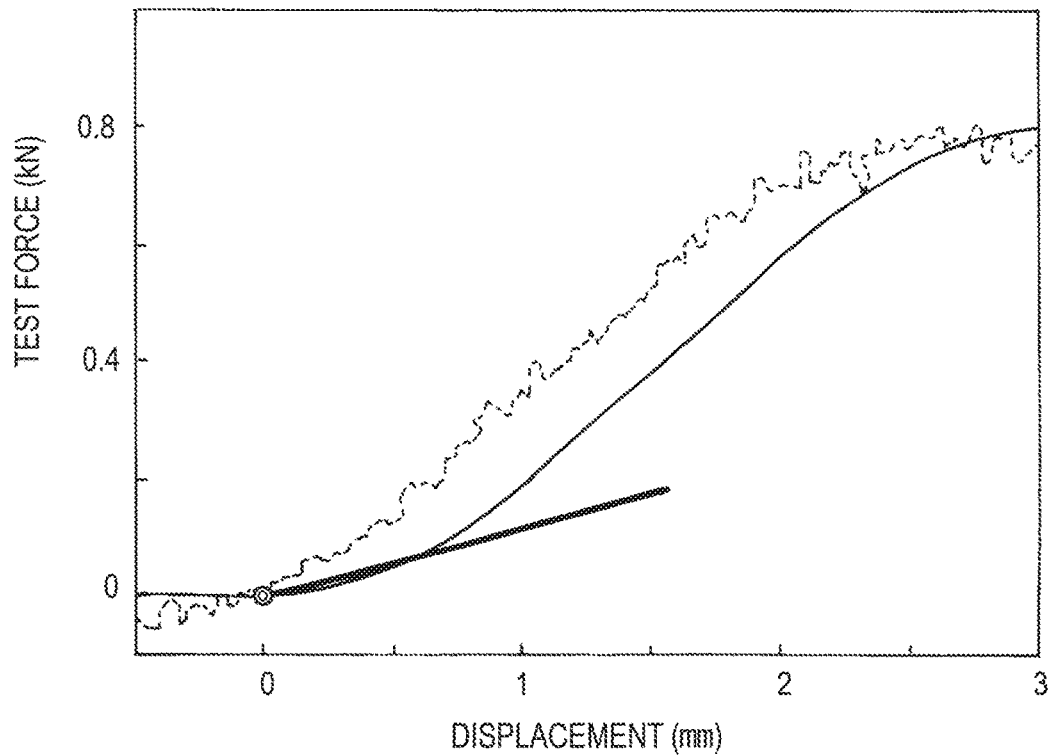
FIG. 17(a) is a test force-displacement diagram.
Figure 17B:
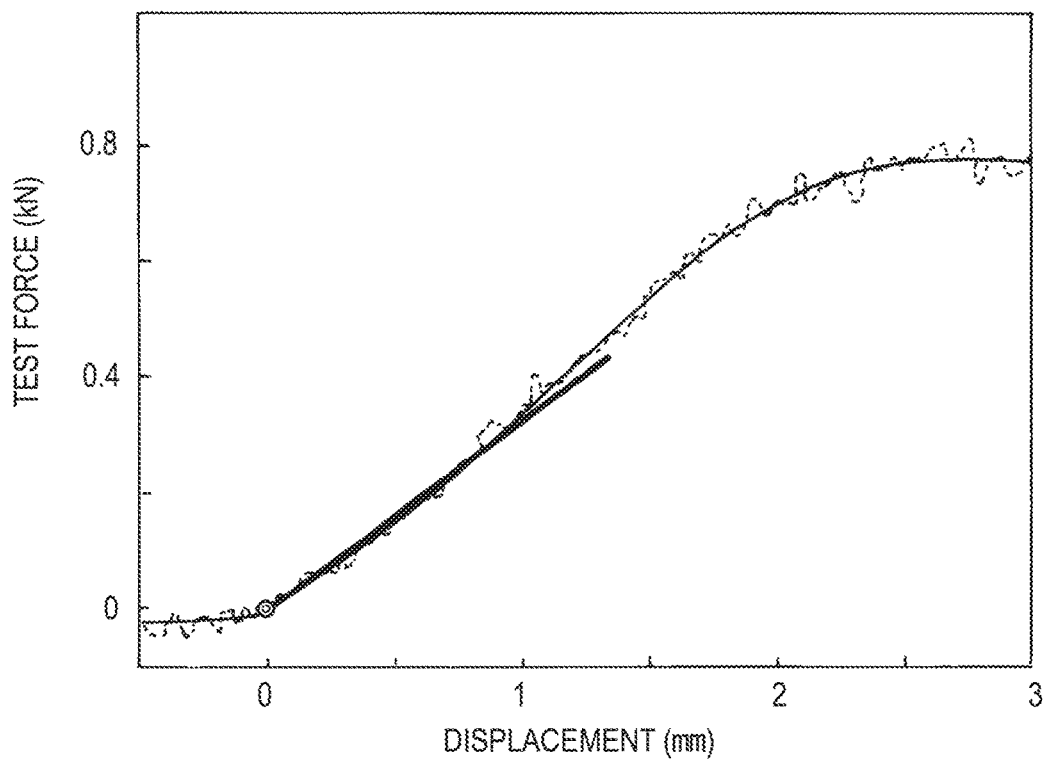
FIG. 17(b) is another test force-displacement diagram.

Another embodiment will be described. FIG. 16 is a test force-displacement diagram at the time point before the test force is applied to the test piece during the high-speed tensile test. A vertical axis indicates the test force and a horizontal axis indicates the displacement. The horizontal axis may be replaced with the time since the displacement is substantially proportional to the time. Thus, the data shown in FIG. 16 is also the time-series data of the invention. FIGS. 17(a) and 17(b) show the test force-displacement diagram at the time when the test force starts to be applied to the test piece in FIG. 16 in a state where the horizontal axis is enlarged. FIG. 16 is a graph illustrating a case in which the raw data is divided at the start point A and the breakage point B and is subjected to the low-pass filtering. FIG. 17(a) is a graph illustrating the elastic modulus when the filtering is performed without dividing the data at the start point A and FIG. 17(b) is a graph illustrating the elastic modulus when the filtering is performed by dividing the data at the start point A. In the graphs of FIGS. 16 and 17, a vertical axis indicates the test force (kN: Kilo Newton) and a horizontal axis indicates the displacement (mm: Millimeter). Here, the waveform of the raw data is indicated by a dashed line and the waveform of the data subjected to the filtering is indicated by the solid line. Further, in FIGS. 17(a) and 17(b), a straight line starting from an origin (start point) indicated by a double circle in the graph is indicated by a bold line in order to illustrate the elastic modulus.

The elastic modulus is an inclination of an elastic range of the test force-displacement diagram. Thus, in order to obtain the elastic modulus, the test force-displacement diagram showing a relationship between the test force based on the output signal of the load cell 27 received by the main body control device 41 at a predetermined time interval and the displacement (growth) of the test piece TP obtained from the output signal of the stroke sensor 33, that is, a relationship between the test force and the displacement at a certain time is created.

In the embodiment shown in FIG. 16, as the change point, the start point A where the test force suddenly starts to increase and the test force is applied to the test piece TP so that a test substantially starts and the breakage point B where the test piece TP is broken are detected (step S11). Then, the raw data of the test force is divided into the section until the start point A where the test starts, the section from the start point A to the breakage point B, and the section after the point where the test force becomes 0 (zero) after the breakage to obtain the divided data D1, D2, and D3 (step S12). Then, the low-pass filtering is performed on each of the divided data D1, D2, and D3 according to the wavelet transform (step S13, S14) and the data is combined according to the original time series (step S15). Additionally, the section until the point where the test force of the raw data becomes 0 (zero) after the breakage from the breakage point B between the divided data D2 and D3 is interpolated by using the method described with reference to FIGS. 13 to 15.

Figure 20:
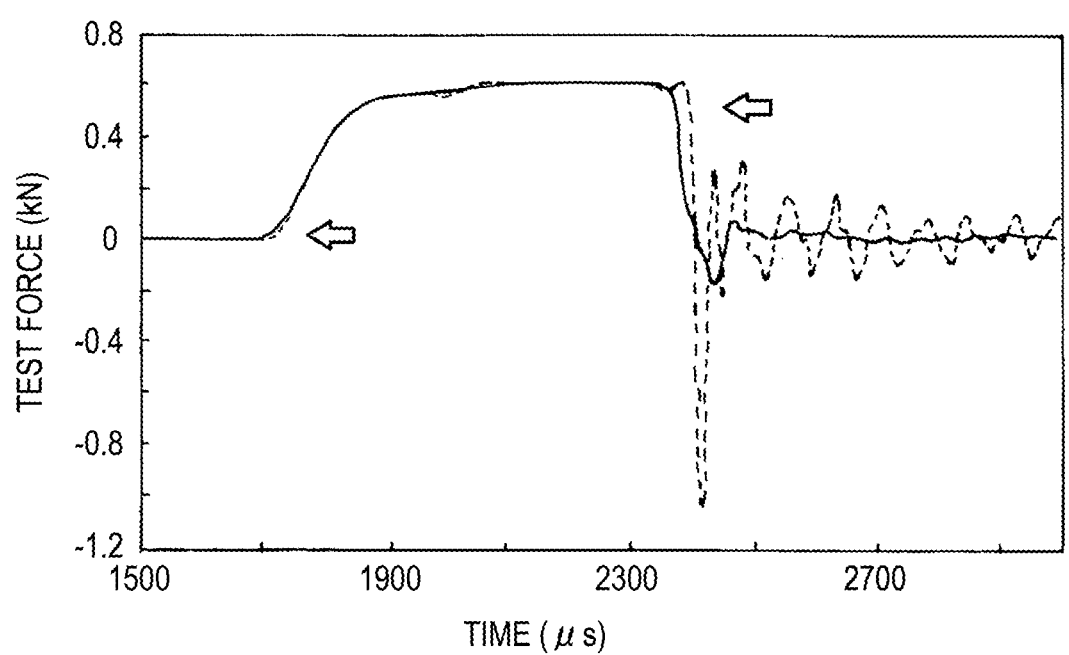
FIG. 20 is a graph showing a low-pass filtering result according to conventional movement average.

As described above with reference to FIG. 20, when the conventional filtering is performed without dividing the data, a change in waveform after the filtering indicated by the solid line becomes smaller than a change in waveform of the raw data indicated by the dashed line in the vicinity of the start point and the breakage point. As a result, the point (the actual start point) where the test force value becomes 0 (zero) immediately before the start of the test of the raw data and the start point after the filtering are different in time. Thus, as shown in FIG. 17(a), the inclination of the data subjected to the filtering becomes smaller than that of the raw data in the elastic range immediately after the start of the test in the test force-displacement diagram and thus a small elastic modulus is calculated.

When the raw data of the test force is divided into three data, that is, the data until the start point A, the data from the start point A to the breakage point B, and the data after the breakage point B and is subjected to the low-pass filtering, also in the test force-displacement diagram shown in FIG. 16, a phenomenon in which a change in waveform subjected to the filtering indicated by the solid line becomes smaller than a change in waveform of the raw data indicated by the dashed line in the vicinity of the start point A and the breakage point B is improved. Then, as shown in FIG. 17(b), it is possible to calculate a more appropriate elastic modulus for the raw data in the elastic range immediately after the start of the test in the test force-displacement diagram. In this way, when the start point is detected as the change point where the raw data to be subjected to the filtering is divided and the low-pass filtering is performed on the divided data, an accurate time in which the test force is actually applied to the test piece TP and the corresponding displacement amount are held before and after the low-pass filtering and thus an appropriate elastic modulus is obtained.

Additionally, in the above-described embodiment, the high-speed tensile test has been described. However, the invention can be applied to the material test in which there is a sudden change point in the time-series data of the test force measured by the load cell 27 and the material test includes a destruction test in which a compressive load is applied to a test sample such as concrete, a punching test in which a punch is made to collide with a test piece, or an impact test such as a three-point bending test in which a punch beats a test piece supported by a support point.

Further, the meaning of the term of the breakage in the invention includes destruction, punching, substantial deformation, and the like.

The invention claimed is:

1. A noise removal method of removing high-frequency noise from raw data corresponding to time-series data of a test force detected by a force detector during a material test of applying a test force to a test object, comprising:
   a data dividing step of detecting a change point where a test force value changes from the raw data and dividing the raw data before and after the change point;
   a low-pass filtering step of removing high-frequency noise from each data divided in the data dividing step by a low-pass filter; and
   a data combining step of combining the divided data subjected to the removal of the high-frequency noise in the low-pass filtering step according to the original time series.

2. The noise removal method of the material test according to claim 1,
   wherein the low-pass filter is a wavelet filter, and
   wherein in the low-pass filtering step, the high-frequency noise is removed by discrete wavelet transform and discrete wavelet inverse transform.

3. The noise removal method of the material test according to claim 1,
   wherein the change point is a point where the test force value suddenly starts to increase after the test starts and/or a point where the test force value suddenly starts to decrease due to the breakage of the test object.

4. The noise removal method of the material test according to claim 3,
   wherein a cutoff frequency of the low-pass filter is determined by using a natural frequency of a test machine body obtained by performing Fourier transform on data at a time after the change point.

5. The noise removal method of the material test according to claim 3,
   wherein in the data dividing step, the raw data is divided by excluding data of a predetermined section from the change point, and
   wherein in the data combining step, the divided data subjected to the low-pass filtering are connected by interpolating blank data points corresponding to the predetermined section.

6. The noise removal method of the material test according to claim 1,
   wherein in the data combining step, a value of the change point is compared with a value of a data point at the same time as the change point after the low-pass filtering step of the divided data from the change point including the data at the change point and when the value of the change point is different from the value of the data point after the low-pass filtering step by a predetermined value or more, the value of the data point after the low-pass filtering step is replaced with the value of the change point of the raw data and the divided data after the low-pass filtering step are connected.

7. A material testing machine for applying a test force to a test object by driving a load mechanism, comprising:
   a force detector which detects a test force applied to the test object; and
   a control device which controls the load mechanism,
   wherein the control device includes
   a data divider which detects a change point where a test force value changes from raw data corresponding to time-series data of a test force detected by the force detector and divides the raw data before and after the change point,
a low-pass filter which removes high-frequency noise from each data divided by the data divider, and
a data combiner which combines the divided data subjected to the removal of the high-frequency noise by the low-pass filter according to an original time series.

\* \* \* \* \*